C. M. WILKINS.
Upsetting Tires.
No. 31,422. Patented Feb. 12, 1861.
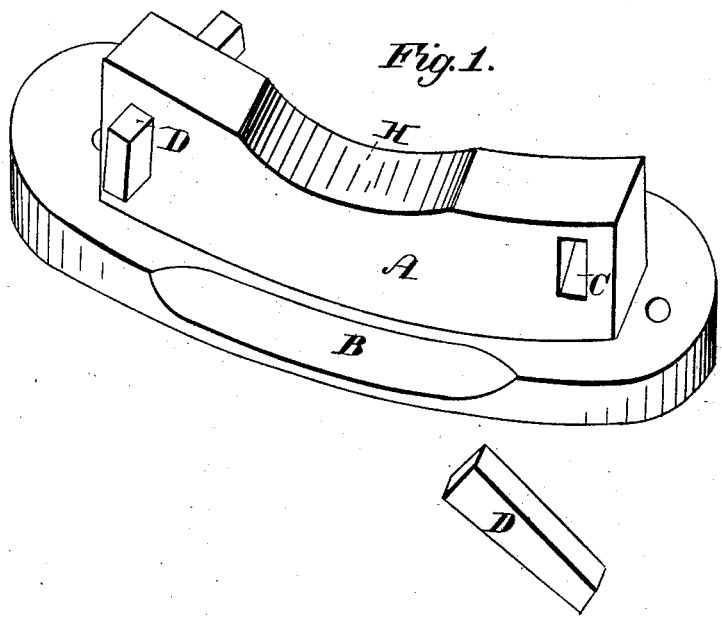
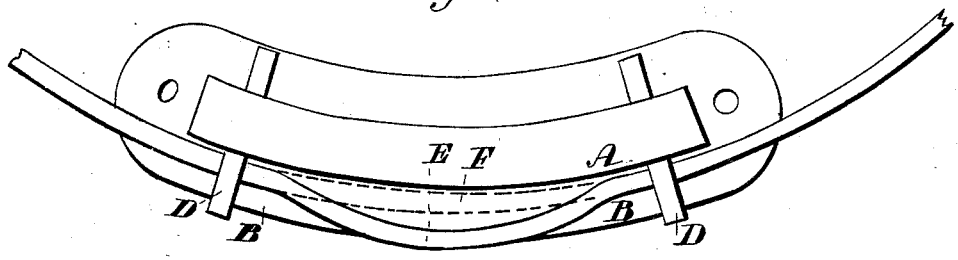
Witnesses.
B. F. Perry
Sela C. Merrell
Inventor.
C. M. Wilkins

UNITED STATES PATENT OFFICE.

C. M. WILKINS, OF WEST ANDOVER, OHIO.

UPSETTING TIRES.

Specification of Letters Patent No. 31,422, dated February 12, 1861.

*To all whom it may concern:*

Be it known that I, C. M. WILKINS, of West Andover, in the county of Ashtabula and State of Ohio, have invented a new and useful Machine for Upsetting Wagon-Tires; and I do hereby declare that the following is a full, clear, and exact description of the construction and operation of the same, reference being had to the annexed drawings, making a part of the specifications, in which—

Figure 1 is a perspective view, and Fig. 2 a top view.

To enable others to make and use my invention, I will proceed to describe its construction and operation.

The perspective view Fig. 1, represents an anvil A, provided with a mortise at each end, one of which is shown at C, the other is represented with the key D inserted. H is a concave depression in the top of the anvil.

To use my machine the operator must heat the tire and form a loop, as shown at E in Fig. 2, which may be done by laying the tire over the concave depression H and hammering it down to fit it. The tire is then secured to the anvil by driving the wedges D D, as shown in Fig. 2 into the mortises. The looped portion of the tire, as shown at E, Fig. 2, is then forced to the dotted line F by hammering, or otherwise while hot, which shortens or upsets the tire as much as the dotted line F is shorter than the loop E.

I am aware that upsets for tire have been made and are in use, all of which and their various parts I disclaim, and confine myself to my invention.

What I claim and wish to secure by Letters Patent is—

The combination of the wedges D D with an anvil in the manner described.

C. M. WILKINS.

Witnesses:
  B. F. PERRY,
  SELA C. MERRELL.